United States Patent
Singer (10) Patent No.: US 10,277,740 B2
(45) Date of Patent: Apr. 30, 2019

(54) LIVE PERSON DETECTION IN AN AUTOMATED CALLING SYSTEM

(71) Applicant: Noetica Ltd, London (GB)

(72) Inventor: Danny Singer, Robertsbridge (GB)

(73) Assignee: Noetica Ltd., London (GB)

( * ) Notice: Subject to any disclaimer, the term of this patent is extended or adjusted under 35 U.S.C. 154(b) by 13 days.

(21) Appl. No.: 15/495,662

(22) Filed: Apr. 24, 2017

(65) Prior Publication Data

US 2017/0230504 A1    Aug. 10, 2017

Related U.S. Application Data

(63) Continuation of application No. 14/273,340, filed on May 8, 2014, now abandoned.

(30) Foreign Application Priority Data

May 10, 2013   (GB) .................................. 1308508.9

(51) Int. Cl.
*H04M 3/00*       (2006.01)
*H04M 3/51*       (2006.01)

(52) U.S. Cl.
CPC ....... *H04M 3/5158* (2013.01); *H04M 3/5166* (2013.01); *H04M 3/5183* (2013.01); *H04M 2203/2027* (2013.01); *H04M 2203/306* (2013.01)

(58) Field of Classification Search
USPC ................................ 379/88.01–88.19, 266.08
See application file for complete search history.

(56) References Cited

U.S. PATENT DOCUMENTS

| 6,021,176 A | * | 2/2000 | McKendry | .............. H04M 1/64 379/35 |
| 6,850,602 B1 | | 2/2005 | Chou | |
| 7,310,412 B1 | * | 12/2007 | Tuttle | .............. H04M 1/274575 379/69 |

(Continued)

FOREIGN PATENT DOCUMENTS

| EP | 1563674 B1 | 12/2010 |
| GB | 2293723 A | 4/1996 |
| WO | WO 2008/008117 A1 | 1/2008 |

OTHER PUBLICATIONS

Search Report dated Oct. 28, 2013 for GB Patent Application No. 13085080.9 filed May 10, 2013.

*Primary Examiner* — Solomon G Bezuayehu
(74) *Attorney, Agent, or Firm* — Knobbe, Martens, Olson & Bear, LLP (57) ABSTRACT

A method of operating a telephony system for determining whether a telephone call made to a call destination terminal is a live call which is answered by a live person and not by an answering machine, the system performing steps comprising detecting that the telephone call has been answered and that the call is in progress transmitting one or more voice messages in a transmitted signal to the call destination terminal analyzing a received signal from the call destination terminal to detect voice signals, and determining whether or not the telephone call is a live call by applying test criteria to relative timing of events in the received signal and transmitted signal, the test criteria being based on an expected pattern of speech and silence representative of normal conversation.

22 Claims, 10 Drawing Sheets

(56) References Cited

U.S. PATENT DOCUMENTS

| | | | |
|---|---|---|---|
| 2002/0051522 A1* | 5/2002 | Merrow | H04M 1/82 |
| | | | 379/88.01 |
| 2002/0085686 A1 | 7/2002 | Cullis | |
| 2008/0015846 A1 | 1/2008 | Acero et al. | |
| 2008/0052344 A1 | 2/2008 | Alecci et al. | |
| 2012/0201362 A1 | 8/2012 | Crossan et al. | |
| 2013/0094646 A1 | 4/2013 | Akula et al. | |
| 2013/0108031 A1 | 5/2013 | Merrow et al. | |
| 2013/0136242 A1 | 5/2013 | Ross et al. | |
| 2014/0334612 A1* | 11/2014 | Singer | H04M 3/5166 |
| | | | 379/88.01 |

\* cited by examiner

LIVE PERSON DETECTION IN AN AUTOMATED CALLING SYSTEM

CROSS-REFERENCE TO RELATED APPLICATIONS

This application is a continuation of application Ser. No. 14/273,340, filed May 8, 2014, which claims priority to and the benefit of United Kingdom Patent Application No. 1308508.9 filed in the United Kingdom Intellectual Property Office on May 10, 2013, the entire contents of which are incorporated herein by reference.

BACKGROUND OF THE INVENTION

Field of the Invention

This invention relates to automated calling systems for placing telephone calls.

SUMMARY OF THE INVENTION

The present invention provides a telephony system and a method of operating such a system.

BRIEF DESCRIPTION OF THE DRAWINGS

Embodiments of the present invention will now be described by way of example only and with reference to the accompanying drawings of which.

DETAILED DESCRIPTION

It is desirable in many applications for such systems to be able to detect when a call is answered whether the call destination terminal is being operated automatically using pre-recorded speech messages or voice synthesis to generate voice signals returned to the automated calling system. In other words, the system needs to be able to make a determination of whether the call is a so-called "live call" in which the call destination terminal is operated by a human being and signals received from the call destination terminal originate from a person speaking into a microphone in real time.

The invention has particular application to call center dialing management systems where agent workstations are manned by call agents. Automatic dialing systems place calls to a number of recipients and calls when answered are then connected to agent workstations linked by a Computer Telephony Integration (CTI) system which integrates computer and telephony systems. CTI systems may include features such as automatic call distribution for management of incoming calls and predictive dialing to enable the system to deliver calls which have been answered to an agent as he or she becomes available to take the next call. Predictive dialing thereby enables an agent who has finished dealing with a previous call to be immediately able to pick up a new answered call.

EP 03809779 for example describes a predictive dialing system which monitors progress of an agent script which is followed by the agent during a call and which system predicts using statistical analysis the optimum number of outgoing calls to be dialed in order to match the availability of agents.

A particular problem with automatic dialing systems is that calls answered automatically by voicemail or answer machines can cause inefficient use of agent's time since the agent may need to spend time listening to the recorded message and manually classifying the call as unproductive.

A number of methods have been proposed for automatically detecting whether an answered call is a live call or whether it has been answered by an answering machine. GB 2293723A describes a digital signal processing card for determining the presence of an answering machine. Received audio voice energy is analyzed to detect time periods during which there is a pause in the voice energy and thresholds are applied to the detected time periods to classify the pattern of voice energy as being consistent with either a live call or a response from an answering machine. Calls which are determined to be answered by the recorded voice of an answering machine are accordingly dropped and are not routed to agent terminals whereas calls determined to be live calls are routed to agents for subsequent handling of the call.

A disadvantage of this arrangement is that it may take several seconds for the determination to be made, during which time, if the call is a live call, the called party will have listened to a period of silence of several seconds and may hang up with the perception that this is a nuisance call or an automated call for which no agent was available.

It is widely accepted that the maximum acceptable delay between a call being answered and it being delivered to an agent is two seconds. Although a number of automatic systems for answering machine detection have been adopted, limiting their operation to a period of no more than two seconds generally results in a low level of confidence in the determination. Misidentification of a call to a live person as a call to an answering machine is known as a "false positive". False positives are the source of most silent calls generated by automatic dialing systems which are of concern to the public as they can result in anxiety to the called party, particularly where such calls are repeated over a relatively short time period.

The use of such answering machine detection techniques has therefore been regulated in a number of jurisdictions so that their use has become severely restricted.

Figure 1:
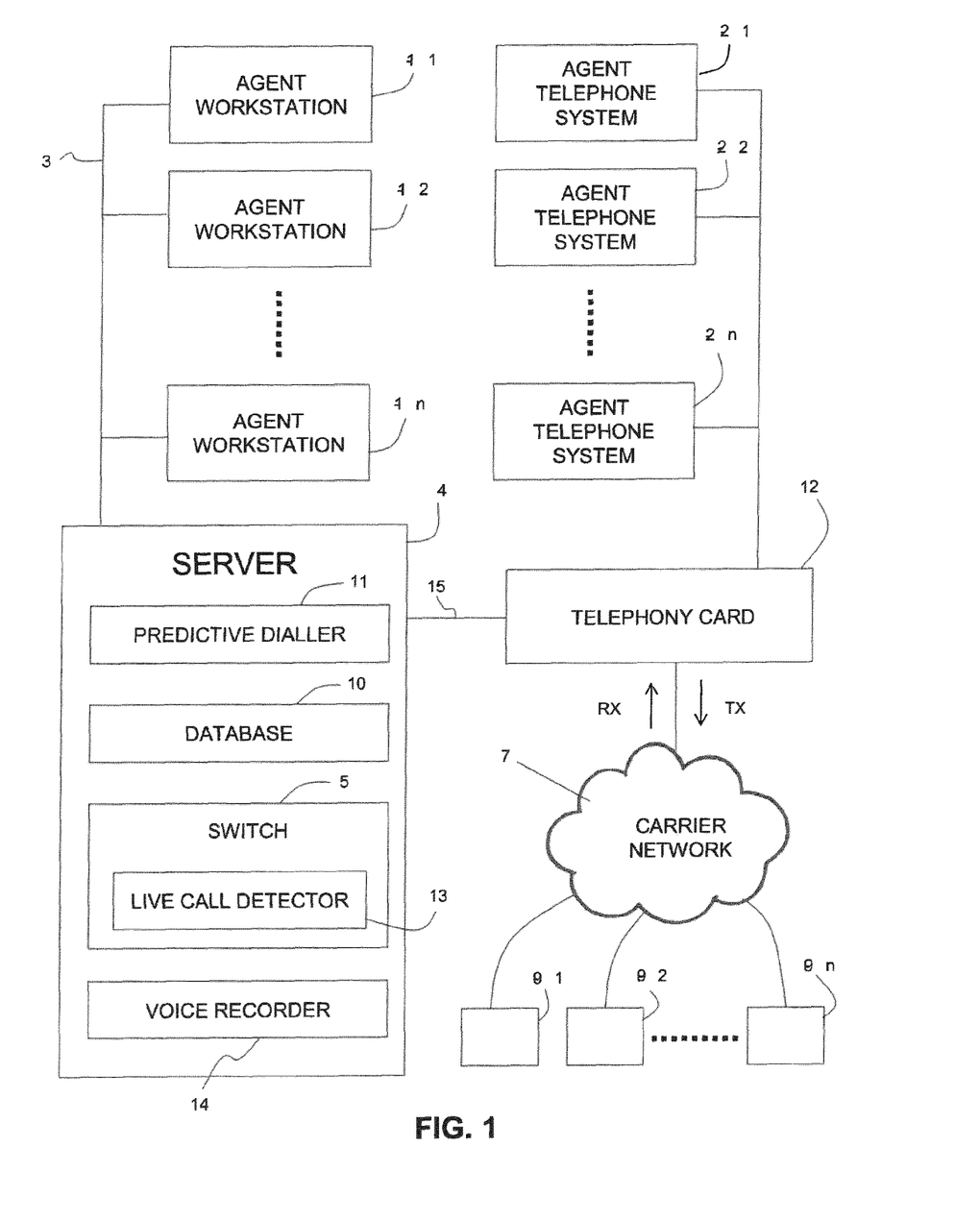
FIG. 1 is an overview of a call center system.

FIG. 1 illustrates an overview of the operation of a call center system. The call center system includes a number of agent workstations 1-1, 1-2, . . . , 1-n. Each workstation 1-1, . . . , 1-n has a respective agent telephone system 2-1, 2-2, . . . , 2-n and is connected a server computer 4 through a local area network (LAN) 3. The server computer 4 is connected to a telephony card 12, which is connected to each of the agent telephone systems 2-1, 2-2, . . . , 2-n, via voice links, to a carrier network 7. Connected to the carrier network 7 are a large number of call destination terminals 9-1, 9-2, . . . , 9-k including landline telephones and mobile telephones which the call center system may call using the network 7. The server computer 4 executes a number of applications including a predictive dialer 11, a switch 5 having functionality of a PBX (private branch exchange), and a voice recorder 14. The server computer 4 also has a database 10 storing data including telephone numbers of call destination terminals to be called and also data acquired from completed calls.

The predictive dialer 11 is arranged to cause the switch 5 to speed dial the numbers of a number of the call destination terminals 9-1 . . . 9-$k$ connected to the network 7. The number of calls dialed at any time is dependent on a predicted number of agents who will be available to deal with each call when it is answered by a respondent at a call destination terminal.

Also shown in FIG. 1 is a telephony card 12 operating as an interface between the server computer 4 and both the carrier network 7 and the agent telephone system 2-1, . . . 2-$n$. The switch 5 executed by the server computer 4 allows the server to function as a PBX in routing calls between agent telephone call and destination terminals.

The switch 5 has as one of its software components a live call detector 13 which interacts with the telephony card 12 to determine, based on a received signal from a call destination terminal when a telephone call is in progress, whether the received signal represents a live person response in which voice signals originate from detection in real time of a human voice at the call destination terminal. The operation of the live person detector 13 will be described in detail below.

A further software component executed by the server computer 4 is the voice recorder 14 which functions to record onto memory a number of messages to be played back under the control of the live call detector 13 as part of a live call detection method.

Each agent records a first message $R_1$ which is a prompt, for instance "hello";

a second message $R_2$ which is an introduction, for instance "Hi. My name is John and I am calling on behalf of ABC Company to discuss your recent enquiry," and a third message $R_3$ which is a clarification request such as "pardon me I did not quite catch that?"

For each message type $R_1$, $R_2$, $R_3$ there will be a respective recording for each agent A, B, C, . . . , denoted herein as messages $R_1(A)$, $R_1(B)$, $R_1(C)$; $R_2(A)$, $R_2(B)$, $R_2(C)$, etc.

Figure 2:
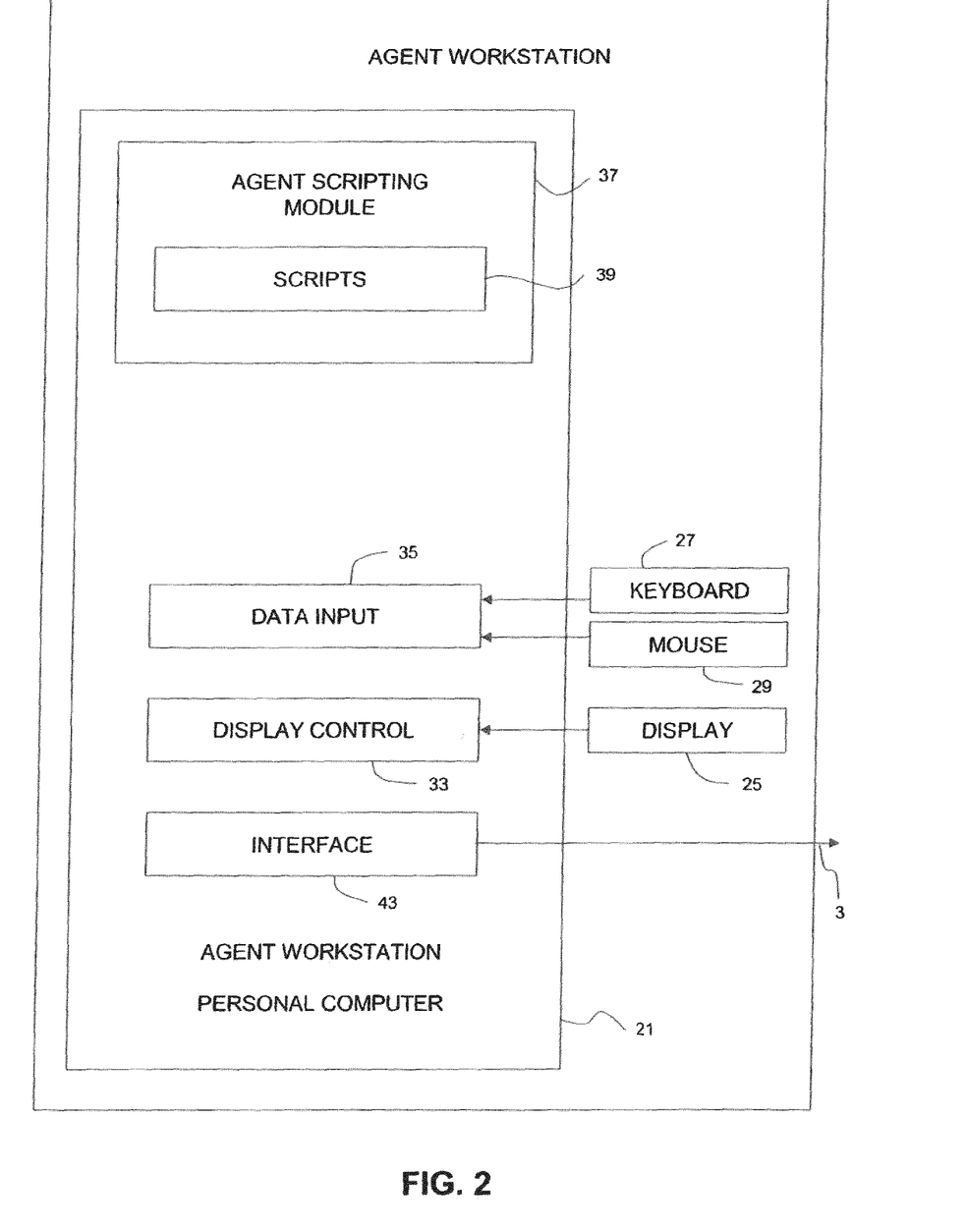
FIG. 2 illustrates the functional software and hardware modules at each agent workstation incorporated in the call center system of FIG. 1.

FIG. 2 illustrates the components of each agent workstation 1. Each workstation comprises a personal computer 21, a display 25, a keyboard 27 and a mouse 29. The personal computer 21 includes a display control unit 33 effective to control the display 25 and a data input unit 35 responsive to signals produced by the user using the keyboard 27 and mouse 29. Each agent telephone system 2 which is located at the workstation comprises a microphone and headset.

The personal computer 21 also includes an agent scripting module 37 including a store 39 storing a series of scripts which may be displayed on the display 25. Each script is designed to guide the conversation between the call center agent and the telephone respondent for a particular purpose, for example an opinion poll of voting intentions for a forthcoming election, to enable the agent to extract specific information from the respondent. This information may be input into the data input unit 35 via the keyboard 27 and/or mouse during the telephone conversation between the agent and the respondent as will be described in more detail hereafter.

Signals indicating that the agent has actually finished the call and has reached an "idle" state are also passed to the predictive dialer 11. Finally, signals indicating that the agent has logged "onto" or "out from" the particular workstation 1 and thus has become available or is no longer available are generated at the relevant times by the agent scripting module 37 and passed through the interface 43 to the predictive dialer 11.

Figure 3:
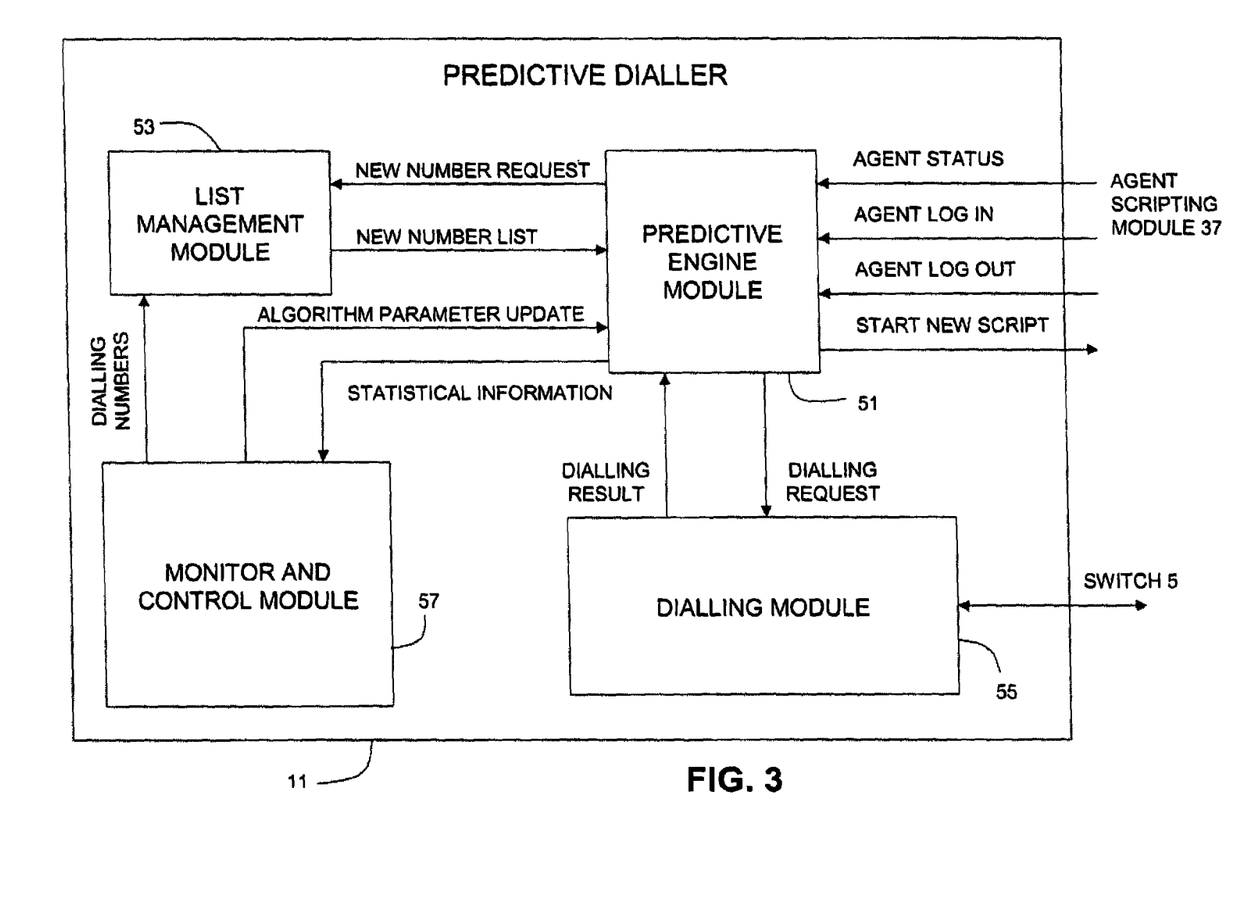
FIG. 3 illustrates the functional components of the predictive dialer incorporated in the call center system shown in FIG. 1 together with the message flow between each module.

FIG. 3 is an overview of the various functional modules of the predictive dialer 11.

Status signals representative of the "idle" states and log on or log off signals from the interface 43 in the agent scripting module 37 within each agent workstation 1 are received by a predictive engine module 51, this module also being effective to send signals back to the agent scripting module 37 in each workstation 1, these signals being effective to cause a new script stored in the script store 39 to start to run at the workstation 1.

The predictive engine module 51 is also linked to a list management module 53, a dialing module 55 and a monitor and control module 57. The list management module 53 stores the numbers to be dialed. The dialing module 55 is effective to send dialing requests to the call center switch 5 and to receive information back from the call center switch 5 as to whether each telephone 9 has been answered. The monitor and control module 57 is effective to provide dialing numbers to the list management module 53 and to provide control parameters to the predictive engine module 51.

In response to the status signals and log in/log out signals received from the agent workstations and the parameters received from the monitor and control module 57, the predictive engine module 51 instructs dialing module 55 to dial numbers produced from numbers stored in the list management module 53. Thus the predictive engine module 51 includes respective interfaces to the agent workstations 1 connected to the LAN 3, the dialing module 55, the list management module 53 and the monitor and control module 57. The predictive engine module 51 also includes an agent status table 69 including data derived from the agent login and/or logout information signals and the "idle" state signals provided from the agent workstations 1. A statistics unit 71 is provided for maintaining statistics over a predefined period of time, for example one hour.

The predictive engine module 51 also includes an algorithm module 73 programmed with an algorithm and the current variable values for use in the algorithm to enable the calculation of the number of respondent phones to be dialed at any particular time from the agent status information stored in the agent status table 69 and the statistical information provided to the predictive engine module from the monitor and control module 57 at that time.

The list management module 53 contains respective interfaces to the monitor and control module 57 and the predictive engine module 51. The list management module 53 includes a relational database system including a list of all of the numbers to be dialed using any particular script stored in the agent workstations 1, together with a cache storing the dialing numbers to be included in the next list of new numbers to be dialed.

The monitor and control module 57 is a user interface and thus includes a display together with a display control unit, a keyboard and mouse together with a data input control system. Interfaces are provided to respectively the list management module 53 and the predictive engine module 51.

The dialing module 55 includes respective interfaces to the predictive engine module 51 and the switch 5, together with a buffer for storing the next numbers to be dialed.

Further details may be found in EP 03809779.

Live Call Detector

The live call detector 13 is used in conjunction with the telephony card 12 to emulate conversation between an agent and a respondent at a call destination terminal 9-1 . . . 9-n using pre-recorded messages of the voice of the agent, and monitoring the timing of received voice signals relative to the messages. Since the pattern of speech and silence by either party in a typical telephone conversation follows a predictable pattern, which pattern may be regarded as an etiquette of telephone conversation, any departure from the expected pattern can be identified as being consistent with the call being answered by an answering machine.

Typically an answering machine will deliver a pattern of speech and silence which ignores any incoming messages and is followed by a continuous tone which is an indicator that the calling party is expected to leave a message after the tone. Detection of such a tone in signals received from the call destination terminal is therefore generally conclusive that an answering machine has responded to the call.

During normal conversation between live persons, any speech from the respondent would not be expected to interrupt speech from the agent. If therefore the system delivers a recorded introductory message which sounds like a live person speaking and it is not interrupted by speech from the respondent, this is taken to be an indication that it is a live call in which a human respondent believes they are in conversation with the agent.

In the event of there being an interruption by the respondent, a clarification message pre-recorded by the agent is then delivered and, if after the end of the clarification message the respondent speaks within a predetermined waiting period, this taken to be consistent with normal conversation, leading to a determination of a live call in which the human respondent is engaged in conversation.

For such a live call, the agent whose voice is being used in the pre-recorded messages is then connected to continue the call. The respondent is therefore unlikely to be aware that the initial phase of providing pre-recorded messages is anything other than a conversation with a live agent.

The live call detector 13 is a computer program which in one embodiment is executed in the server computer 4 and which interacts with the telephony card 12 over a network connection 15 using function calls provided by an application program interface (API) in the server computer.

The telephony card 12 is a proprietary extension card which is user configurable to make use of on-board digital signal processors (DSPs) for signal analysis and signal generation. The telephony card 12 is connected to the server computer 4 by a PCI/cPCI connection and communicates using TCP/IP protocol A telephony card configuration tool is provided in the server computer 4 for the purpose of configuring the function of the telephony card 12 so that an algorithm controlled by the live person detector 13 invokes processes in the telephony card 12 and receives via return function calls from the telephony card 12 the results of signal monitoring and analysis as a telephone call progresses. The algorithm controlled by the live person detector 13 and executed partly in the server computer 4 and partly in the telephony card 12 will now be described with reference to FIGS. 4 and 5.

Figure 4A:
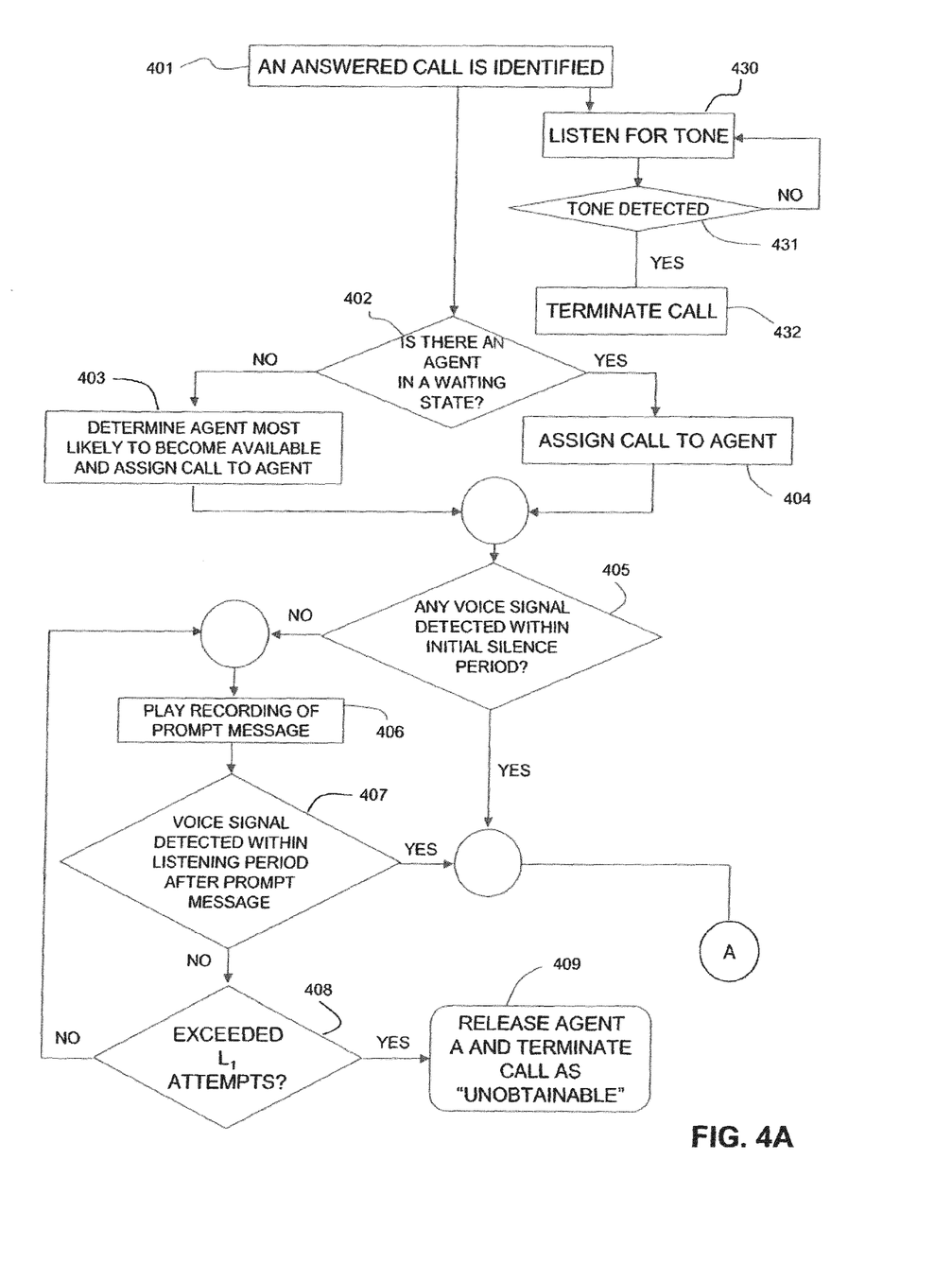
FIGS. 4A to 4D illustrates schematically an algorithm for determining whether an answered call is a live call or whether the response is from an answering machine.

As described above, the predictive dialer 11 initiates the setting up of telephone calls to telephone numbers extracted from the database 10 and telephone calls are placed via the telephony card 12 over the carrier network 7. For each call, the predictive dialer 11 refers to the database 10 to determine whether a live call detection flag has been set for the telephone number to be dialed and only invokes the live call detector 13 if the flag has been set. For one such call to a call destination terminal 9-1, an answered call is identified at step 401 by the telephony card sensing signaling information in this example from an ISDN line. The telephony card 12 makes a function call to the switch 5 to signal this event and the switch in turn makes a remote procedure call into the predictive dialer 11 so that the predictive dialer then knows that the call has been answered.

At step 402 the predictive dialer 11 checks the status of the agent workstations 1-1 to 1-n to see if any agent is currently waiting for a call dialog to commence. If there is such an agent, the predictive dialer 11 at step 404 assigns to the call the waiting agent. If no agent is currently in a waiting state, step 403 determines which agent is most likely to become available and assigns this call to that agent.

At step 405, the algorithm determines whether, within a period $P_1$ from the call being answered, any voice signal is detected in the received signal RX from the call destination terminal 9-1. In order to make this determination, the incoming received signal is digitized and analyzed by the telephony card 12 to categorize the received signal as having one of the following three states;

"silence"; the measured signal amplitude is less than a predetermined threshold and is determined to represent line noise or background noise detected microphonically or otherwise at the call destination terminal 9-1;

"tone"; a continuous sinusoidal tone of a single frequency is detected, the frequency corresponding to one of a set of tones which are characteristic of answering machine tones, the signal being greater than the predetermined threshold and persisting for a minimum of 64 milliseconds.

Tone detection may for example be configured to detect frequencies of 1000 Hz and 1,400 Hz which are common frequencies used by answering machines;

"voice signal"; the signal waveform has an amplitude greater than the predetermined threshold and does not correspond to one of the above single frequency tones and is therefore classified as corresponding to a spoken word, grunt, or other vocally generated sound, whether live or pre-recorded.

In FIG. 5A-5E the received signal is represented by RX and the transmitted signal by TX, the signal state being represented by position in a horizontal time line progressing from left to right transitioning between a lower level representing silence and an upper level representing the presence of voice signal.

The period $P_1$ referred to above with reference to step 405 is therefore an initial listening period and is configured to have a duration in the range 250 to 1000 milliseconds. If at the end of period $P_1$ the live call detector 13 determines that no voice signal has been detected, i.e. as monitored by the telephony card 12 the state of the received signal has not transitioned from silence to voice signal, the live person detector 13 responds by retrieving from the voice recorder 14 a recording of a prompt message made by the particular agent assigned to this call, in this case agent A, so that prompt message $R_1(A)$ in the form of a wav file is transferred to the telephony card. The received wav file is processed by the telephony card 12 to produce an audio signal transmitted over the telephone line at step 406 in transmitted signal TX to the call destination terminal 9-1.

The prompt message $R_1(A)$ delivered to the call destination terminal 9-1 is therefore "hello" which is intended to prompt the recipient, if indeed it is a human recipient, to speak. After delivering the prompt message $R_1(A)$, step 407 follows with a further listening period of duration $P_1$, during which any vocal response made by the recipient will be detected in the telephony card 13 by sensing a transition from the silence state to the voice signal state and upon such detection being signaled to the live call detector 13 the algorithm moves forward to a further phase of monitoring commencing at step 410 in FIG. 4B as described below.

If however no voice signal detection occurs within period $P_1$, the recorded prompt message $R_1(A)$ is again played at step 406 and the listening step 407 being repeated. In the absence of any such detection, this cycle repeats until a threshold number $L_1$ of listening steps is determined at step 408 to have been reached, at which time the live call detector 12 signals to the predictive dialer 11 that the call should be terminated at step 409 as unobtainable. In this embodiment $L_1=3$.

Figure 4B:
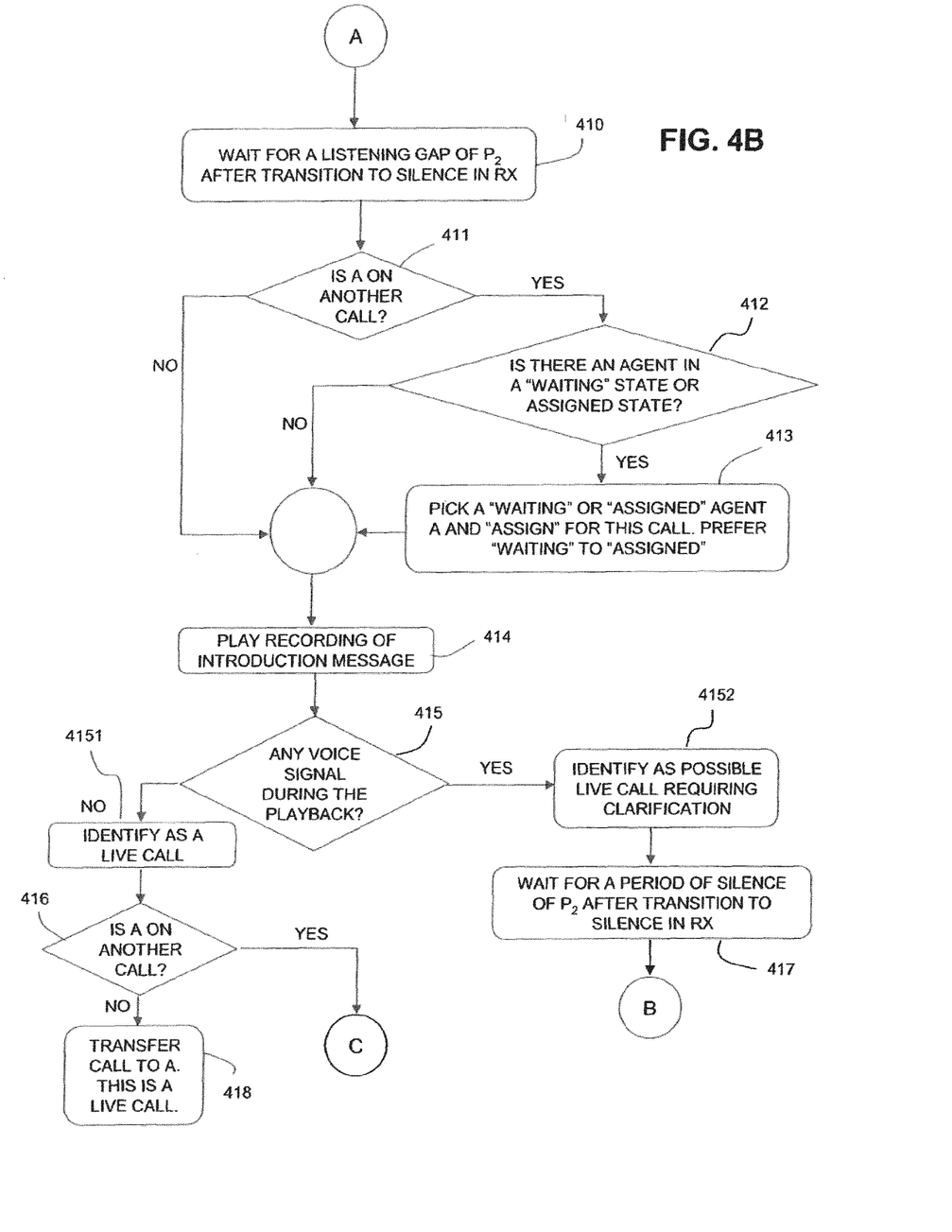

If however the voice signal is eventually detected during one of the listening periods $P_1$, the next phase of monitoring commences at step 410 in FIG. 48.

At step 410, the state of the received signal RX is monitored in the telephony card 12 to detect a return transition to the silence state which, upon being communicated by the telephony card 12 to the live call detector 13, initiates the timing of a further listening period of duration $P_2$ which in the present embodiment is configured to be in the range 500 to 1500 milliseconds.

During this further listening period $P_2$ the live call detector 13 communicates with the predictive dialer 11, indicating that potentially a live call is in progress, the predictive dialer checking at step 411 whether the currently assigned agent A is busy on another call. If the answer is yes, at step 412 the predictive dialer 11 checks to see if there is an agent in a waiting or assigned state and, if so, selects at step 413 a new agent for the present call.

At the end of the period $P_2$, the introduction message $R_2(A)$ (or $R_2(B)$ if the new agent is assigned) is transmitted at step 414 to the call destination terminal 9-1, the process of generating the message being similar to that described above in which the wav file is obtained by the live call detector 13 and transmitted to the telephony card 12 for reproduction as an analogue audio signal to be output via the ISDN line to the call destination terminal.

In the present example, the introduction message is "Hi, my name is John and I am calling on behalf of ABC Company to discuss your recent enquiry".

For the duration of the introduction message $R_2(A)$, the telephony card 12 listens at step 415 for any change in the status of the received signal RX, i.e. listens for a transition to voice signal state which would indicate that the introduction message $R_2(A)$ was being interrupted by voice signal from the call destination terminal 9-1. Any such interruption could be consistent with the call having been answered by an answering machine, or could be consistent with an accidental interruption by a live person. If no such interruption is detected, the call is determined to be a live call at step 4151 and, provided the assigned agent is determined to be still available at step 416, the call is transferred at step 418 to the currently assigned agent in response of a signal provided by the live call detector 13 to the predictive dialer 11.

Figure 4C:
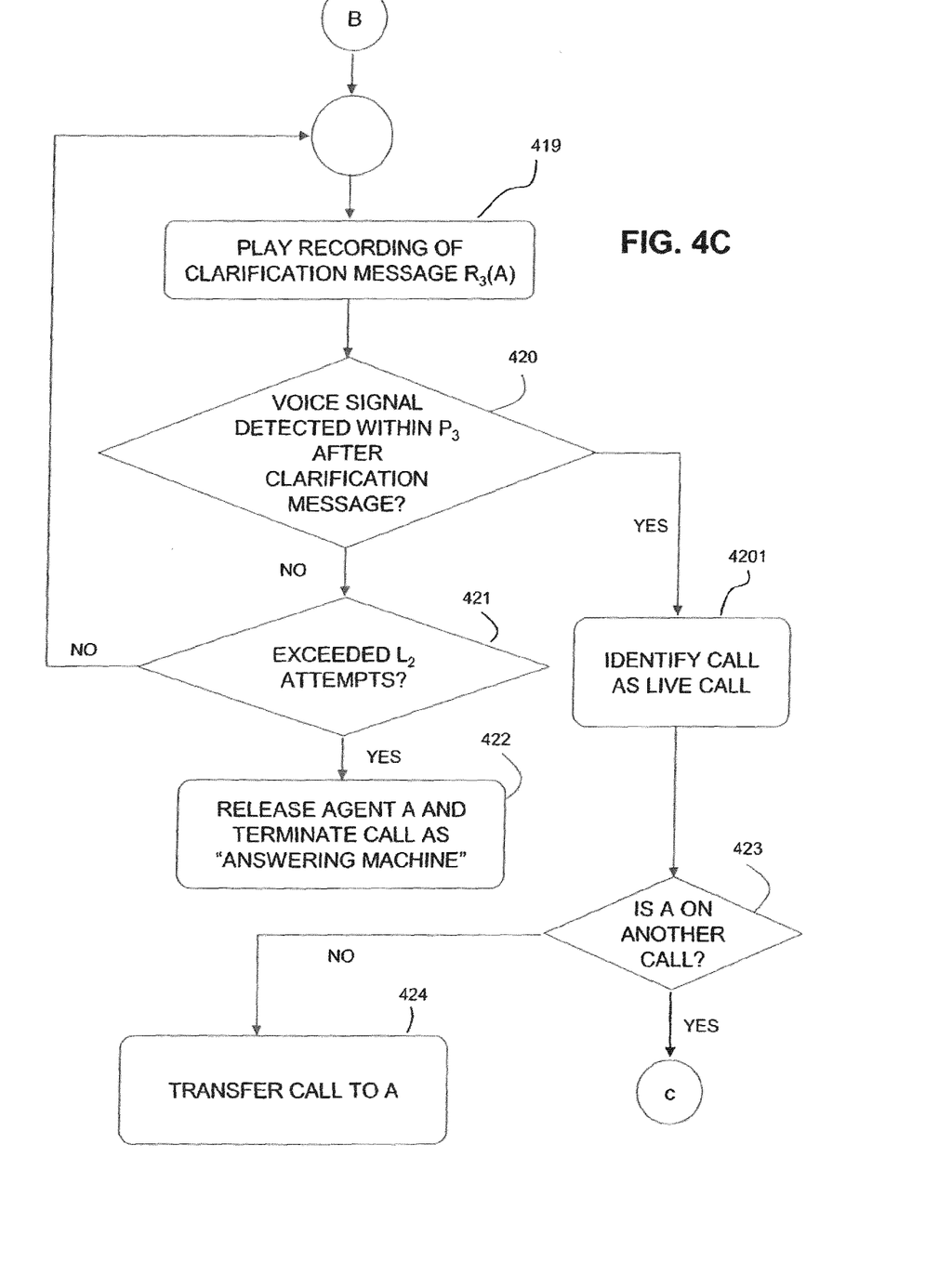

If however an interruption during playback of the introduction message $R_2(A)$, is detected at step 415, further steps are required to determine whether the interruption was consistent with an answering machine or with a live person. The live call detector 13 at step 4152 signals to the predictive dialer 11 that this call is possibly a live call requiring clarification and at step 417 listens for a further period of silence $P_2$ before generating a clarification message $R_3(A)$. The clarification message is generated by the live call detector 13 retrieving the appropriate wav file and transmitting the file to the telephony card 12 where it is used to generate at step 419 a signal in the transmitted signal TX.

If during a subsequent clarification gap $P_3$, detection at step 420 of a transition to voice signal state on the received signal RX is communicated to the live call detector 13, the live call detector then determines the call to be a live call at step 4201 since this corresponds to a pattern of speech and silence which is consistent with normal telephone conversation. The clarification gap $P_3$ is a listening period with a duration set typically in the range 500 to 1,500 milliseconds. The call is then transferred to the predictive dialer 11 to the currently assigned agent at step 424 by action of the predictive dialer 11, provided that the agent is determined at step 423 not to be already on another call.

If no transition to voice signal state is detected at step 420 within period $P_3$, the recorded clarification message $R_3(A)$ is again played at step 419 and the step 420 of listening for period $P_3$ is repeated. This process continues for a number of attempts which, if the number is determined to exceed a limit of $L_2$ at step 421, results in the live call detector 13 determining the call to have been answered by an answering machine. In this example $L_2$ is 2. This is signaled to the predictive dialer 11 which then follows at step 422 a predetermined procedure to abandon the call as being answered by an answering machine.

Figure 4D:
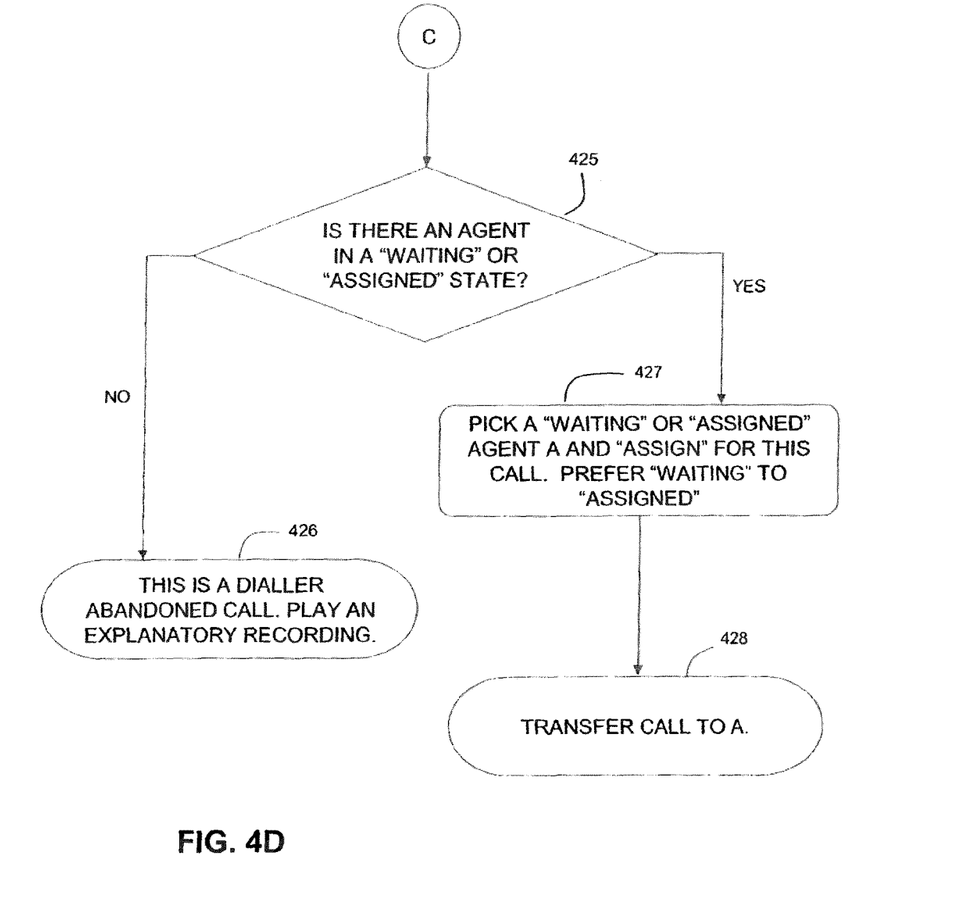

For calls determined at step 4201 to be a live call and for which the agent is not free, the predictive dialer 11 determines at step 425 whether there is another agent available. If there is more than one agent available, the predictive dialer 11 at step 427 selects the agent according to a preference for an agent who is ready and waiting to one who is only assigned to the call but still dealing with a previous call.

The call is then transferred at step 428 by the predictive dialer 11 to the selected agent as a live call. If no agents are available, the call is abandoned at step 426 in accordance with a predetermined procedure by the predictive dialer 11.

The predictive dialer 11 may have a number of alternative strategies for dealing with abandoned calls. In a preferred embodiment, a pre-recorded explanatory message is played with an explanation of why the call was made and the lack of available agents, optionally providing a telephone number for the recipient to contact the company to speak to an operative.

When an answered call is identified at step 401, the live call detector 13 also commands at step 430 the telephony card 12 to listen for a transition to the tone state in the received signal RX. This activity proceeds in parallel with the above described steps 402 to 428. If at any time during the call, the transition to tone state is detected at step 431, this is communicated from the telephony card 12 to the live call detector 13 which in turn signals this event to the predictive dialer 11. The call is then terminated at step 432 by the predictive dialer 11.

FIG. 5 provides some illustrations in terms of the signal state on received signal RX and transmitted signal TX for a number of cases.

Figure 5A:
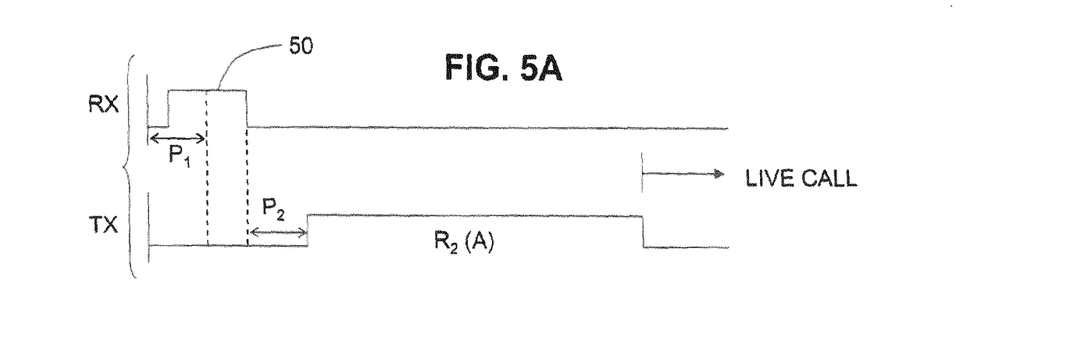
FIGS. 5A to 5E illustrates schematically the timing of received voice signals and transmitted messages during an answered call as managed by the algorithm of FIG. 4.

FIG. 5A illustrates a case where voice signal 50 is detected shortly after the instant that the progress of the call begins and before the expiry of the initial listening period $P_1$. A listening gap $P_2$ is created after the transition to silence in the received signal RX and then introduction message $R_2(A)$ recorded by agent A is played in the transmitted signal TX. At the end of the recorded introduction message $R_2(A)$, since no further voice signal is detected from the respondent, the call is determined by the live call detector 13 to be a live call and progresses under the control of the predictive dialer 11 with the agent A engaging in conversation in accordance with a prepared script.

Figure 5B:
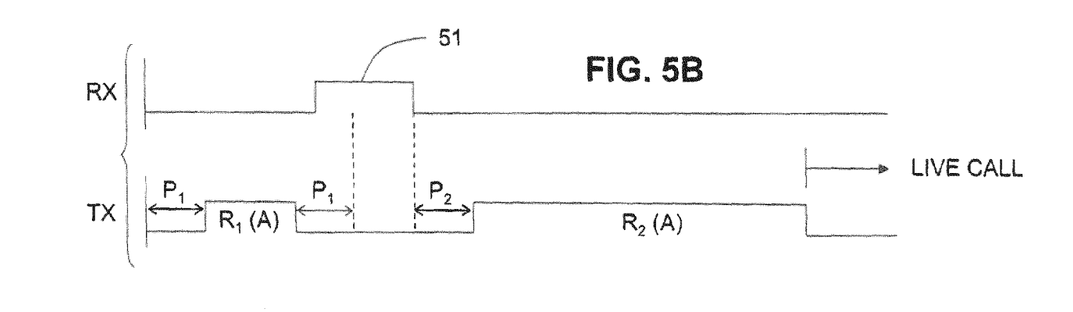

FIG. 5B illustrates a second case in which initially there is an absence of voice signal on the received signal RX during the initial listening period $P_1$. The prompt message $R_1(A)$ recorded by agent A is then played and during a subsequent listening period $P_1$, a voice signal 51 is detected in the received signal RX. At the end of the voice signal 51, and after a listening gap of $P_2$, the introduction message $R_2(A)$ recorded by agent A is then played in the transmitted signal TX. No interruption by way of voice signal on the received signal RX occurs during this playback of message $R_2(A)$ and the call is therefore determined to be a live call. The progress of the call then continues under the control of the predictive dialer 11 with the agent A engaging in conversation in accordance with a prepared script.

Figure 5C:
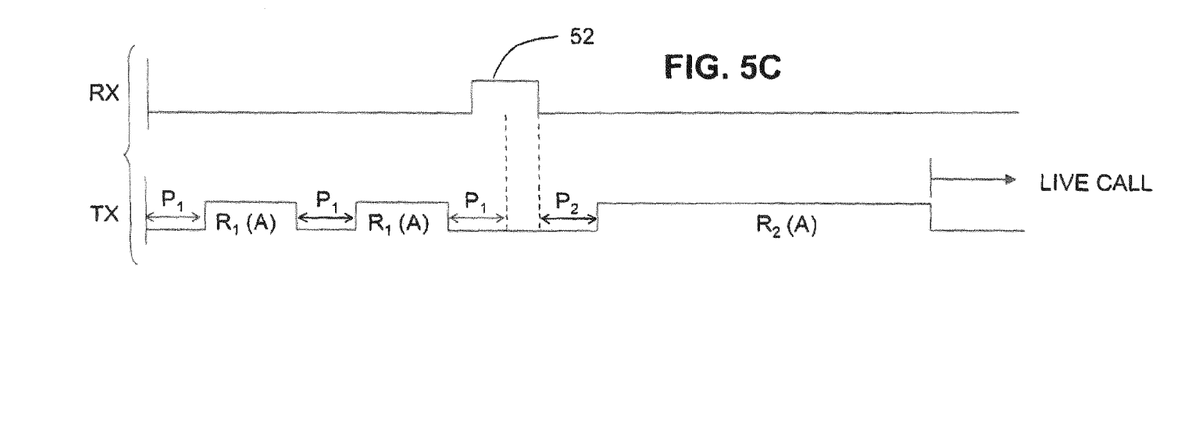

FIG. 5C illustrates a third case in which no voice signal is detected in the received signal during an initial listening period $P_1$, or during a second period $P_1$ following a prompt message $R_1(A)$ recorded by agent A. After generation of a further prompt message $R_1(A)$, a voice signal 52 on received signal RX is detected within a further listening period $P_1$. At the end of the voice signal 52, and after a further listening period $P_2$, the introduction message $R_2(A)$ recorded by agent A is played and is not interrupted by any voice signal on the received signal RX. Consequently the call is determined to be a live call and continues under the control of the predictive dialer 11 with agent A engaging in conversation with the respondent.

Figure 5D:
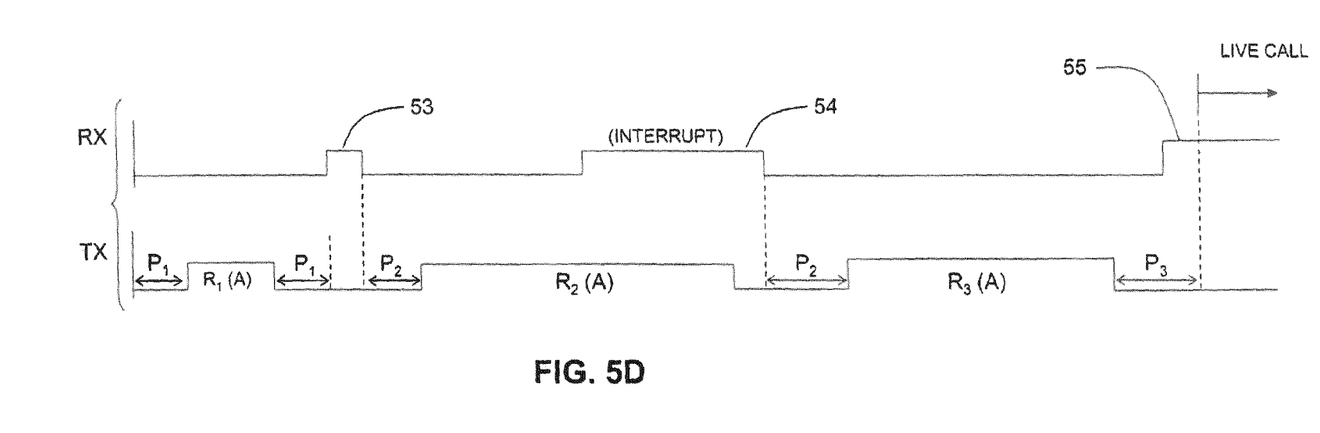

FIG. 5D illustrates a fourth case in which voice signal 53 is detected in RX within period $P_1$ following prompt message $R_1(A)$ recorded by agent A so that introduction message $R_2(A)$ recorded by agent A is played in the same way as in the example of Figure B. However, the respondent interrupts the introductory message as detected by a further voice signal 54 so that, after a listening period $P_2$ following the end of the voice signal 54, the clarification message $R_3(A)$ recorded by agent A is played. During a clarification gap $P_3$ following the end of the clarification message $R_3(A)$, a further voice signal 55 is detected in the received signal RX, resulting in the call being determined to be a live call.

Figure 5E:
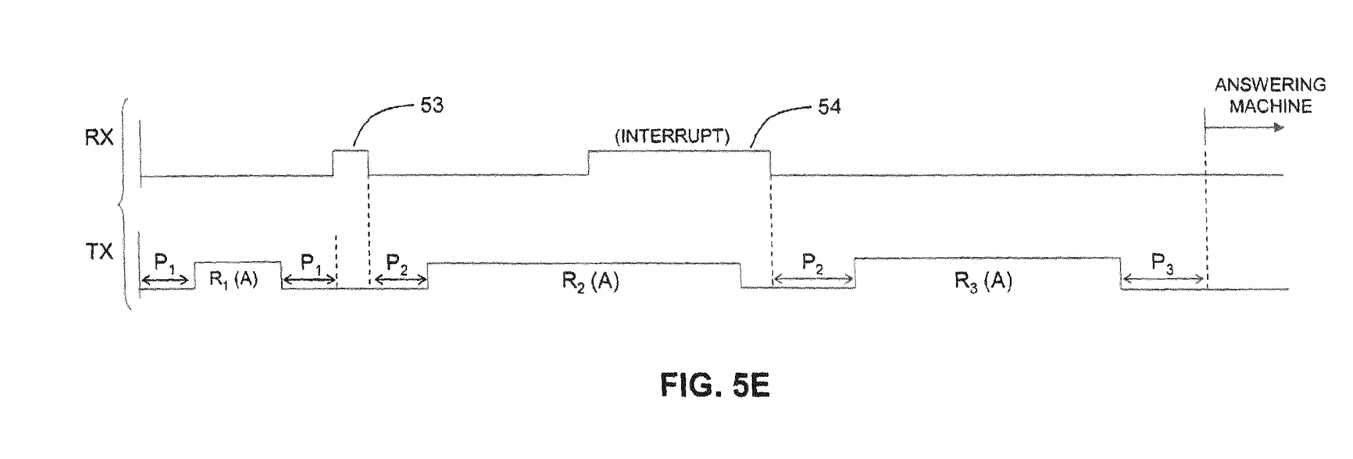

FIG. 5E illustrates a further case which follows a similar pattern to the example of FIG. 5D except that no voice signal corresponding to voice signal 53 is detected within the period $P_3$ after the end of the clarification message $R_3(A)$. In this case, the call is determined not to be a live call and to have been answered by an answering machine. The call is then abandoned by the predictive dialer 11 in accordance with a predetermined procedure.

In a preferred embodiment, the system shown in FIG. 1 including the server computer and telephony card with its associated software is provided as an integral part of the Synthesys™ Voice platform available from Noetica Limited. The telephony card 12 in this example is a Prosody X card available from Aculab™. This system is capable of handling telephone calls to a wide range of telephony devices including IP phones or soft phones using VoIP as well as digital or POTs (plain old telephones) devices in various configurations.

Aculab make available libraries of API functions which are utilized in making function calls between the live call detector 13 and telephony card 12. The software comprising the live call detector 12 is conveniently written in C#(sharp). Of the available Aculab functions, particular use is made of "listener" activities which can be set up either to detect continuous tones or voice signals as described above.

In use of the system, it is envisaged that each of the agents assigned to agent workstations 1-1 to 1-$n$ will at the commencement of their period of duty make a recording of the prompt message $R_1$ introduction message $R_2$ and clarification message $R_3$. As explained above, any interaction with a person answering a call will initially include the pre-recorded voice of the agent until such time as the live call detector 13 indicates to the predictive dialer 11 that this is a live call, after which time the agent is connected and the conversation continues according to the script provided to the agent by the agent workstation. The recipient of the call will therefore be unaware that the initial stage of the call is not being handled by a live agent and the transition from recorded voice of the agent to real time voice of the agent should be seamless. This avoids situations occurring in which a recipient of a call hears silence for more than two seconds since the timing of the prompt message by the live call detector 13 will always provide the prompt message within this time frame. This is a desirable feature in meeting requirements of legislation concerning the making of automated and semi-automated calls.

There may however arise situations where the agent initially assigned to a call becomes unavailable by the time the call has been determined to be a live call so that there is a change of agent assigned to the call. In this eventuality, the predictive dialer 11 may be configured to modify the script so that the agent provides to the recipient and explanation of the change in voice.

To further improve the likelihood that the recipient is unaware of the recorded nature of the agent voice at the prompt stage, several versions of the prompt message $R_1$ may be recorded with different intonation and played in succession when it is necessary to provide more than one prompt message.

In an alternative embodiment, the predictive dialer 11 may be configured to only dial a new number when an agent is already in a waiting state, thereby assuring that there is no change in assigned agent between initially dialing the call and determining the call to be a live call.

Alternative embodiments are envisaged in which for example the above described functions regarding the live call detector 13 and telephony card 12 are all carried out within the telephony card itself using firmware.

Figure 6:
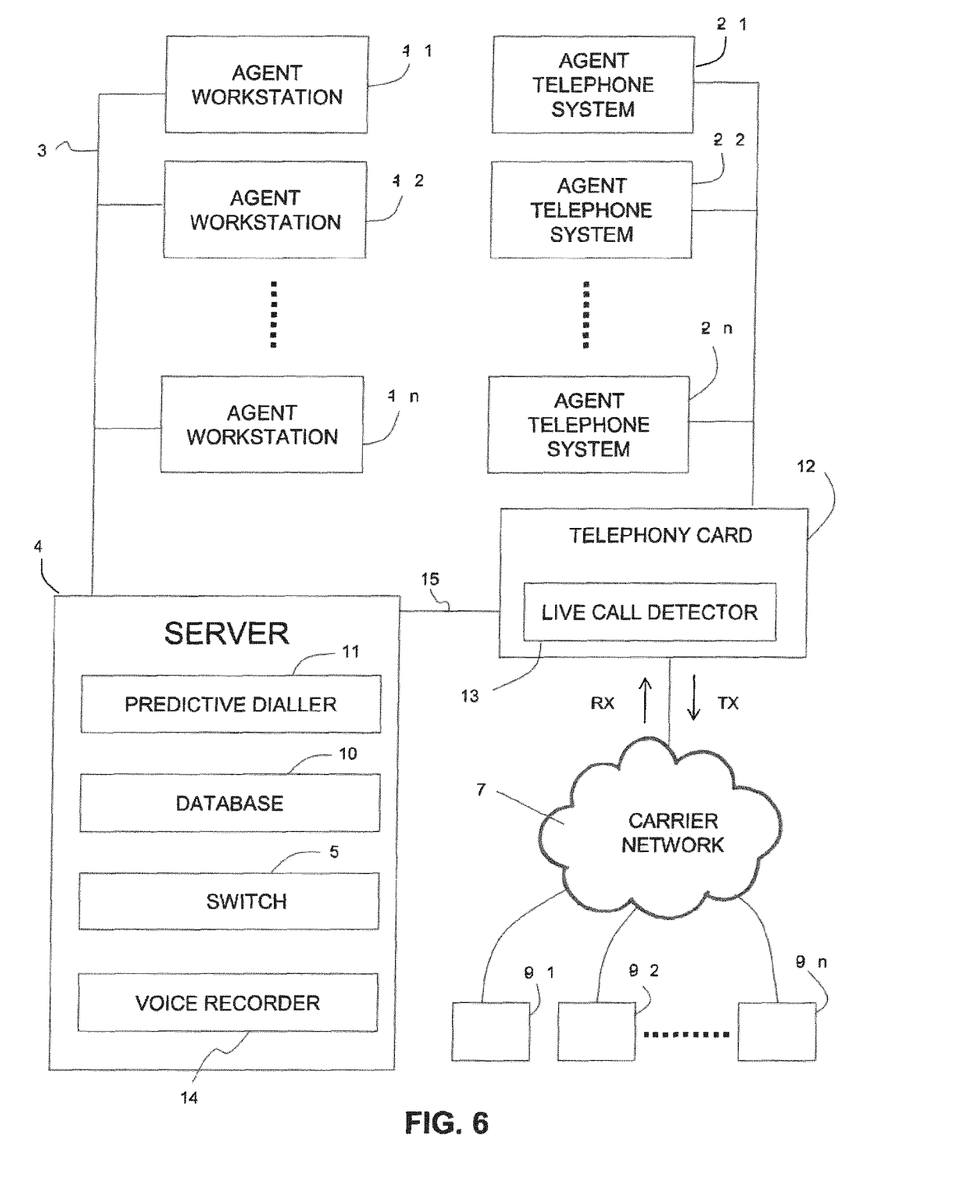
FIG. 6 is an overview of a call center system according to an alternative embodiment of the present invention.

In the case where the telephony card 12 provides all of the functions of the live call detector 13, the telephony card 12 may be sold as a hardware product which may be added to existing systems with minimal modification, i.e. simply replacing the existing telephony card with the new card which has the live call detector functionality. Such an arrangement is shown schematically in FIG. 6 where the live call detector 13 is shown located within the telephony card 12, the remaining details corresponding generally to those of FIG. 1.

What is claimed is:

1. A method for connecting a telephone call made by a telephony system, comprising a number of agent workstations and a computer connected to a communication network, to a destination terminal also connected to the communication network, wherein the method is executed by the telephony system and comprises:
   dialing the number of the destination terminal;
   detecting that the destination terminal has answered and that the call is in progress;
   transmitting, by the computer over the communication network, a voice message in a transmitted signal to the destination terminal;

receiving and analyzing, by the computer, a signal from the destination terminal to detect voice signals within a time period P from a time when the destination terminal has answered, wherein analyzing the received signal comprises:
comparing an amplitude of the received signal to a predetermined threshold amplitude, and
determining whether a tone of a predetermined frequency is present in the received signal;
determining whether:
a) no voice signal is detected in the received signal during transmission of the voice message, and
b) a voice signal is detected in the received signal within a predetermined listening period after transmission of the voice message has ended; and
connecting the destination terminal to one of the agent workstations if conditions a) and b) are satisfied.

2. The method of claim 1, further comprising:
transmitting a prompt voice message to the destination terminal if, within an initial listening period at an initial part of the call, no voice signal is detected by the telephony system; and
transmitting one or more further voice messages to the destination terminal if the telephony system detects a voice signal in the received signal after transmission of the prompt voice message has ended.

3. The method of claim 2, further comprising:
transmitting a prompt voice message to the destination terminal if, within an initial listening period at an initial part of the call, no voice signal is detected by the telephony system;
transmitting a further voice message to the destination terminal if the telephony system detects no voice signal in the received signal after transmission of the prompt voice message has ended;
transmitting a third voice message to the destination terminal if the telephony system detects no voice signal in the received signal after transmission of the said further voice message has ended; and
disconnecting the call if the telephony system detects no voice signal in the received signal after transmission of the said third voice message has ended.

4. The method of claim 1, further comprising:
transmitting a clarification voice message to the destination terminal if the telephony system detects a voice signal in the received signal during transmission of the voice message; and
transmitting another voice message to the destination terminal if a voice signal is detected subsequently in the received signal.

5. The method of claim 1, further comprising detecting voice signals in the received signal by applying the predetermined threshold amplitude to a signal amplitude in the received signal.

6. The method of claim 1, further comprising terminating the call if the telephony system detects, in the received signal, the tone of the predetermined frequency and having an amplitude greater than a predetermined tone amplitude threshold and a duration greater than a predetermined tone length threshold.

7. The method of claim 1, wherein the connecting of the dialed destination terminal to an agent workstation further comprises controlling operation of a predictive dialer to assign the call to an agent workstation selected from the plurality of agent workstations of the telephony system, and wherein the method further comprises generating the transmitted voice messages thereafter from recordings associated with the assigned agent workstation.

8. A telephony system for determining whether a telephone call made to a call destination terminal over a communication network is a live call which is answered by a live person and not by an answering machine, the system comprising:
an interface unit coupled to the communication network; and
a processing apparatus configured to:
place a call to the call destination terminal;
detect that the telephone call has been answered and that the call is in progress,
in response to detecting that a call is in progress, transmit, over the communication network, one or more voice messages in a transmitted signal to the call destination terminal,
analyze a received signal from the call destination terminal to detect voice signals within a time period P from a time when the destination terminal has answered, wherein analyzing the received signal comprises:
comparing an amplitude of the received signal to a predetermined threshold amplitude, and
determining whether a tone of a predetermined frequency is present in the received signal, and
determine that the telephone call is a live call if:
one of the voice messages is an uninterrupted voice message during which no voice signal in the received signal is detected, and
a voice signal is then detected in the received signal within a predetermined listening period after the uninterrupted voice message has ended.

9. The system of claim 8, wherein the processing apparatus is further configured to:
connect the call to a selected one of the agent workstations if the telephone call is determined to be a live call.

10. The system of claim 8, wherein the processing apparatus is further configured to:
transmit a prompt voice message if no voice signal is detected within an initial listening period immediately after the call has been answered, and
if voice signal in the received signal is detected after transmission of the prompt voice message has ended, transmit one or more further voice messages.

11. The system of claim 10, wherein the processing apparatus is further configured to:
transmit a prompt voice message if no voice signal is detected within an initial listening period immediately after the call has been answered,
if no voice signal in the received signal is detected after transmission of the prompt voice message has ended, transmit a further voice message to the destination terminal,
if the telephony system detects no voice signal in the received signal after transmission of the said further voice message has ended, transmit a third voice message to the destination terminal, and
if the telephony system detects no voice signal in the received signal after transmission of the said third voice message has ended, then disconnect the call.

12. The system of claim 10, wherein the processing apparatus is further configured to:
transmit a clarification voice message, if one of the voice messages is interrupted by the occurrence of voice signal detected in the received signal, and if a subsequent voice signal is detected in the received signal, then transmit another voice message.

13. The system of claim 8, wherein processing apparatus is further configured to detect the voice signals by applying the predetermined threshold amplitude to signal amplitude in the received signal.

14. The system of claim 8, wherein the processing apparatus is further configured to:
determine that a call is not a live call if a tone of a single frequency and having an amplitude greater than a predetermined tone amplitude threshold and a duration greater than a predetermined tone length threshold is detected in the received signal.

15. The system of claim 8, further comprising a number of agent workstations, wherein the processing apparatus is configured to control operation of a predictive dialer to connect the dialed destination terminal to an agent workstation if the call is a live call.

16. The system of claim 15, wherein the predictive dialer is adapted to assign the call to an agent workstation selected from the number of agent workstations of the telephony system and wherein processing apparatus is further configured to generate the transmitted voice messages thereafter from recordings of the voice of the assigned agent.

17. The system of claim 8, wherein the processing apparatus comprises a computer and the interface unit comprises a digital signal processor.

18. The system of claim 17, wherein the system is configured to determine whether the call is a live call by execution of program code in the computer interacting with execution of code in the digital signal processor via an application programming interface.

19. The system of claim 17, wherein the system is configured to determine whether the call is a live call by execution of program code executed in the digital signal processor.

20. A non-transitory computer readable storage medium comprising instructions which when executed in a computer system cause the system to carry out all of the steps of the method as claimed in claim 1.

21. A call center system comprising:
a computer;
a number of agent workstations in communication with the computer, each agent workstation including an agent telephone system; and
an interface for connecting the computer and the agent telephone systems to a communication system to which a number of destination terminals are also connected, wherein the computer comprises:
a predictive dialer,
a database storing data including telephone numbers of destination terminals,
a switch operable as a private branch exchange for dialing the telephone numbers of destination terminals and for routing calls between agent telephone systems and destination terminals, and
a voice recorder for storing introductory voice messages associated with respective agent workstations,
wherein the computer is configured to:
a) retrieve from the database the telephone number of a destination terminal,
b) cause the switch to dial the retrieved telephone number,
c) detect that the dialed destination terminal has answered and a call is in progress,
d) select an agent workstation in response to a detection of a call in progress,
e) select an introductory voice message corresponding to the selected agent workstation,
f) transmit, over the communication system, the selected introductory voice message to the dialed destination terminal,
g) analyze a received signal from the dialed destination terminal to detect voice signals within a time period P from a time when the destination terminal has answered, wherein analyzing the received signal comprises:
comparing an amplitude of the received signal to a predetermined threshold amplitude, and
determining whether a tone of a predetermined frequency is present in the received signal,
h) determine that the call is a live call if:
a. no voice signal is detected in the received signal during transmission of the voice message, and
b. a voice signal is then detected in the received signal within a predetermined listening period after transmission of the voice message has ended,
i) if the call is determined to be a live call, connect the call to the agent telephone system of the selected agent workstation, and
j) if the call is determined not to be a live call, terminate the call.

22. The call center system of claim 21, wherein the voice recorder is configured to store introductory voice messages and prompting voice messages, and wherein the computer is further operable, if no voice signal is detected within an initial listening period at an initial part of the call, to:
k) cause the switch to transmit a prompting voice message, and
l) if voice signal is detected in the received signal after transmission of the prompting voice message, cause the switch to transmit one or more introductory voice messages.

* * * * *